T. R. WALLIS.
COTTON-PLANTER.

No. 174,749.  Patented March 14, 1876.

WITNESSES:
E. Wolff
A. F. Terry

INVENTOR:
Thomas R. Wallis
BY
[signature]
ATTORNEYS.

N. PETERS, PHOTO-LITHOGRAPHER, WASHINGTON, D. C.

UNITED STATES PATENT OFFICE.

THOMAS R. WALLIS, OF EGG'S POINT, MISSISSIPPI.

IMPROVEMENT IN COTTON-PLANTERS.

Specification forming part of Letters Patent No. 174,749, dated March 14, 1876; application filed June 19, 1875.

*To all whom it may concern:*

Figure 1:
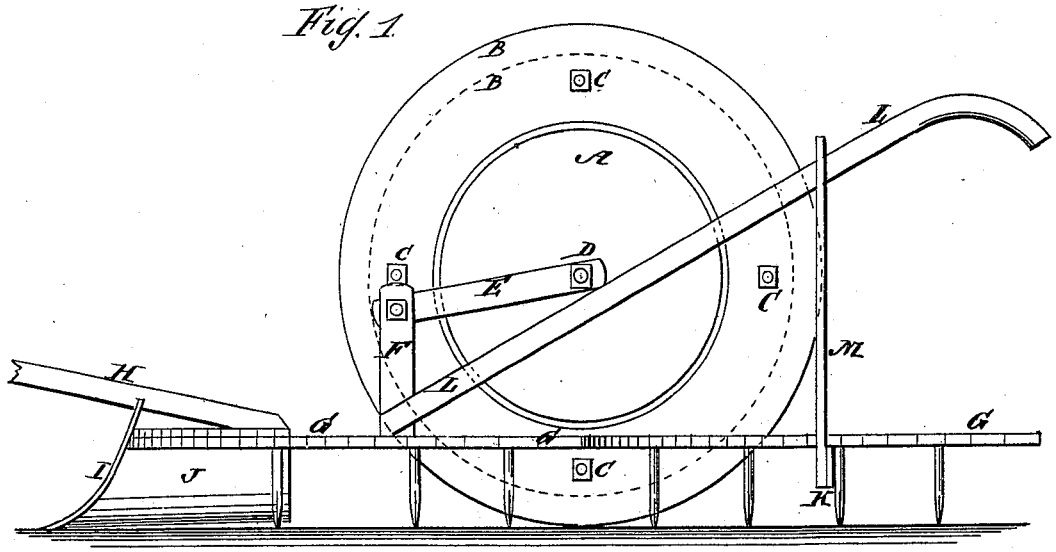
Figure 2:
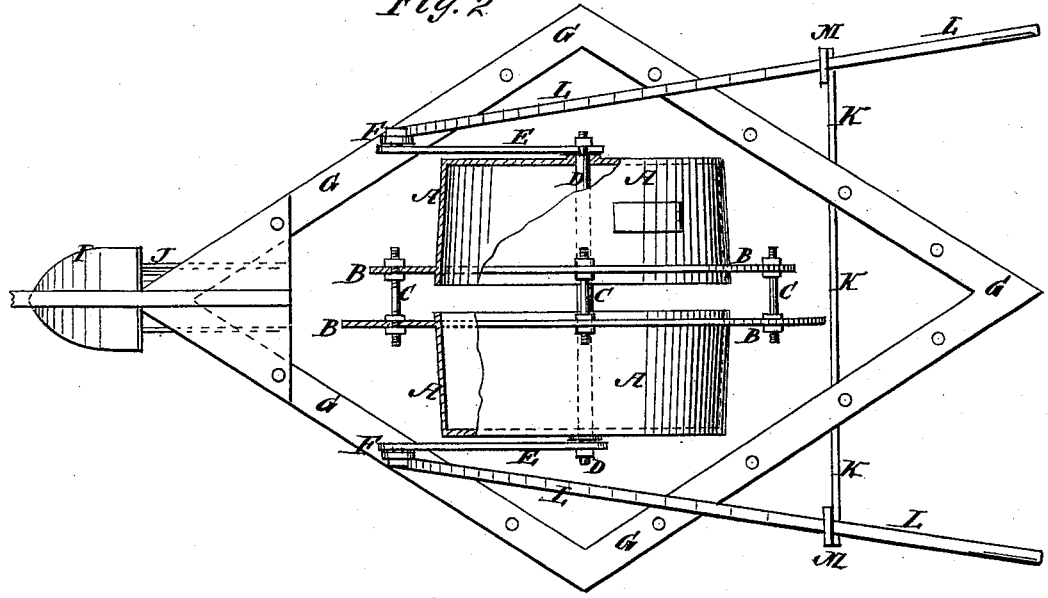

Be it known that I, THOMAS R. WALLIS, of Egg's Point, in the county of Washington and State of Mississippi, have invented a new and useful Improvement in Cotton-Planter, of which the following is a specification:

Figure 1 is a side view of my improved planter. Fig. 2 is a top view of the same, part being broken away to show the construction.

Similar letters of reference indicate corresponding parts.

The invention will first be described in connection with drawing, and then pointed out in the claim.

A are two cylindrical vessels, open at one end and closed at the other, and which are made slightly flaring toward their open ends. To the cylinders A, at the distance of half an inch, more or less, from their open ends, are attached flanges B, one of which is made wider than the other, as shown in Fig. 2, and in dotted lines in Fig. 1. The cylinders A are placed with their open ends toward each other, and are connected by a number of rods or bolts, C, which pass through holes in the flanges B, and have screw-threads cut upon them to receive nuts, four to each rod, which nuts are screwed upon them, one upon each side of each flange B, so that by adjusting the said nuts the cylinders may be adjusted farther apart or closer together, to regulate the amount of seed planted. The flanges B also serve as guides to the seed, conducting it to the ground in a narrow drill, and being set back from the edges of the cylinders A, will not cause the seed to clog. The cylinders A revolve upon a rod or shaft, D, which passes through the centers of the closed ends of said cylinders, and the ends of which are attached to the ends of two bars, E, the other ends of which are pivoted to two standards, F, attached to the forward part of the harrow-frame G. The harrow-frame G is made diamond-shape, and to its forward angle is attached the draw-bar H. To the forward angle of the harrow-frame G is attached a plow, I, for opening a furrow to receive the seed, the sides of which furrow are packed, to prevent them from falling in before the seed is deposited, by a curved guard-plate, J, made U-shaped in its cross-section, which is attached to the angle of the harrow-frame G, and the forward end of which serves as a support for the plow I. The seed is covered and the top of the ridge smoothed off by a bar, K, which is attached to the under side of the rear part of the harrow-frame G. L are the handles, the forward ends of which are attached to the forward part of the harrow-frame G, or to the lower parts of the standards F. The rear parts of the handles L are attached to the upper ends of the standards M, by which they are supported at the desired elevation, and the lower ends of which are attached to the ends of the covering-bar K. If desired, the free ends of bars E may be pivoted to the arch of a cultivator-frame.

Having thus described my invention, I claim as new and desire to secure by Letters Patent—

The seeder-axis D, connected by pivoted bars E E with two standards, F, attached rigidly to frame, as and for the purpose specified.

THOMAS R. WALLIS.

Witnesses:
W. A. POLLOCK,
W. A. HAYCRAFT.